Patented Mar. 4, 1930

1,748,989

UNITED STATES PATENT OFFICE

ARTHUR J. MOXHAM, OF ODESSA, DELAWARE, ASSIGNOR TO ELECTRO COMPANY, A CORPORATION OF DELAWARE

PROCESS FOR TREATING SILICEOUS MINERALS

No Drawing. Application filed November 25, 1924. Serial No. 752,164.

My invention relates to the treatment of siliceous minerals. I have developed my invention in connection with the treatment of greensand or glauconite with sulfuric acid and will describe it with specific reference thereto, but my invention is not limited in its application to this precise mineral.

I have discovered that many of the difficulties in the success of such processes arise from the employment during at least some of the stages of the process of neutral or nearly neutral solutions and have devised a process which permits a strongly acid solution to be used throughout. Nearly neutral or neutral solutions have been considered advisable, if not necessary, in most processes heretofore proposed. In others they were thought to be necessary in order to save acid and for other reasons. In processes which rely upon crystallization to obtain all the metallic values, neutral solutions have been preferably used. Such solutions give rise to the formation of large amounts of gel or fine suspended matter which slow up, and make it difficult and expensive to make an effective filtration. Moreover, when there is a nearly neutral, hot, dilute solution such, for example, as results when wash water is added to the solution, a gel develops by hydrolysis which is composed of fine metallic oxides and of basic sulfates, and it becomes a difficult and expensive problem to separate and recover them.

Another obstacle to the practical success of prior processes for extracting the various metallic values from such minerals as greensand is that they have relied upon crystallization for producing the metal values, with or without subsequent treatment of the crystals thus produced. By one crystallization alone, however, it is impossible to recover all of these constituents. Even with a number of crystallizations and at great consequent expense a considerable portion of the pay values is lost, for each crystallizing operation only extracts a portion of the ingredient to be extracted, and there will always be an irreducible waste carried off after the last crystallization.

The principal feature of my process is that a large part of the metallic values are first obtained by crystallization and the remaining metallic values are afterward obtained by precipitation. I thus rely upon crystallization only so far as it may be economically employed to effect a major separation of the metallic values and only so far as crystallization can be effected from a strongly acid bath. I rely upon precipitation to obtain the last metal values in the mother liquor, precipitation being the most complete means of extraction. Purity is thus made available by crystallization and final efficiency by precipitation.

The principal metallic ingredients of greensand are potash, alumina, ferric oxid and a relatively small percentage of ferrous oxid. The crystallization step is carried on so as to extract a large part of the potash alum. This is itself a valuable product, but can be decomposed into other marketable products, such as pure alumina and potassium sulfate. The precipitation is effected by strong sulfuric acid, the precipitate then containing the ferric oxid of the mineral as ferric sulfate, a part of the alumina of the mineral as aluminum sulfate and a part of the potassium sulfate.

There also may be some ferrous sulfate, or, if preferred, the ferrous sulfate in solution may previously have been converted into ferric sulfate. By calcining and grinding this precipitate, after separation from the mother liquor, a very high grade of paint pigment is obtained, or, without grinding, a product admirably suited for the making of iron and steel is obtained. The strong acid in the mother liquor, from which the precipitate is separated, is available for use in the next leaching operation, and the calcining can be carried on under conditions to recover the evolved $SO_3$ gas as strong or even concentrated sulfuric acid, if desired.

By thus carrying on the process, it is possible effectively and without substantial loss of acid, and with recovery of practically all of the metal values, to employ a bath which has a very strong excess of acid. As a result, the excessive formation of gel in any stage of the operation is practically eliminated, the filtering becomes possible and all the operations become relatively rapid and economical.

I will now describe in more detail one specific embodiment of my process, assuming that it is applied to the treatment of greensand.

The first step is to treat the greensand with sulfuric acid, using a considerable excess of acid. The greater the excess of acid, within reason, the quicker is the sulfatization of the metallic ingredients effected. I prefer to use about 100% excess of acid. I find that I have no difficulty in securing an effective leach in four hours or less under such conditions. I prefer that the acid shall be sufficiently dilute to bring the sulfates directly in solution. For purposes of economy the acid present is largely that which is found in the mother liquor after the precipitation step in the treatment of a preceding batch of mineral, and the water is largely that which has been used for wash purposes in the treatment of a preceding batch of mineral.

The second step is to separate the solution from the residue. I preferably operate as follows:

I first allow the heaviest part of the residue to settle, which takes from half an hour, to an hour, and then decant the solution onto a filter. The small amount of solid matter thus left on the filter is then washed, the greater proportion of the adhering and admixed liquor being extracted with one washing, while two more will ordinarily give a very thorough wash.

The total wash water thus far used is well within that which can be utilized for diluting the acid in the next leach. In some cases, however, the residue held on the filter at this point may be very fine, and hence difficult to wash thoroughly with a reasonable amount of wash water, in which case, the fine residue is saved and put back with the ore of the next leach, without washing.

Water is added to the siliceous residue left in the leaching tank, and the bath is agitated to wash out the pay solution adhering to this residue. In my copending application Serial No. 749,827 filed November 14, 1924, I have described the difficulties which arise at certain stages of processes for chemically treating ores due to hydrolysis. Where neutral dilute solutions are employed, especially when they are hot, hydrolysis occurs with the formation of fine metallic oxides and basic sulfates admixed. In washing this residue the first wash should be with a small amount of water so that the acid solution will be sufficiently strong to avoid hydrolysis. The residue wash water is also used to dilute the acid for the next leach. Before doing so, however, it is usually desirable to filter this wash water because during the leach some silica gel is formed and some of this is retained by the heavier siliceous residue, so that there is a considerable amount suspended in the wash water. I prefer to filter this because I have found that the silica gel so obtained is a valuable product which can be sold for oil purifying or can be treated to be sold as silica for gas works.

Turning now to the solution of metallic sulfates obtained from filtration first described. Without neutralizing any of the excess acid, I concentrate the solution, to a specific gravity of about 1.375 and allow the solution to cool. In from forty-eight to sixty hours a large proportion of the potassium sulfate and aluminum sulfate will crystallize out as potash alum. These crystals have a high degree of purity, as the ferric and ferrous sulfates will not crystallize out from such a solution at this specific gravity. The potash alum is in itself a valuable product of manufacture, but it may be subjected to further treatment as hereinafter described. As the specific gravity of the solution drops after the crystals come out there may be further concentrations of the solution with successive crops of potash alum crystals, by which a fairly complete extraction of the sulfates of potash and aluminum can be effected, but the continual repetition of the procedure adds to the cost, and it is not necessary to carry the crystallization part of the process to such limits.

The mother liquor is separated from the potash alum crystals. It consists mainly of ferric sulfate, which is, however, mixed with such portions of the sulfates of potassium and aluminum as have not been removed by crystallization. The solution may also contain a small proportion of ferrous sulfate, unless the ferrous sulfate has previously been converted to ferric sulfate. These sulfates, are all capable of being precipitated by strong sulfuric acid—hence I boil the solution down or else add a large amount of strong acid to the mother liquor and thereby precipitate these salts out of the same.

The precipitated sulfates are allowed to settle and the liquor is decanted off. This liquor consists principally of free sulfuric acid but will also carry any of the non-precipitated sulfates that may be left in it. This liquor can be utilized in leaching the next batch of mineral.

After decantation the precipitated sulfates are in the form of a fairly concentrated sludge. They are now calcined, preferably in a rotary kiln. The temperature is such as to decompose the sulfates, and the sulfuric acid is driven off and reclaimed in absorbing towers for further use. A fuming acid may be obtained, if desired, by regulating the temperature so as to first dehydrate without driving off any of the sulfuric acid and then driving off the anhydrous acid, so that it may go to the absorbing towers without carrying any water. The residue, during the last part of the calcination, should be agitated, in which case the sulfur remaining at the end of the operation is almost negligible, and much time is saved.

The resulting product is an oxid of iron carrying a small amount of alumina. It is a finely precipitated product and needs comparatively little grinding to make it a valuable paint oxid. Any contaminants of the iron oxid are of such a nature and of such percentage as to be harmless for paint purposes.

Without any further grinding, this product is a most useful one as a material to be used in the manufacture of steel.

Although the potash alum obtained from the crystallization is of itself a valuable end product, it is sometimes advantageous to also calcine the potash alum to separately obtain pure alumina, with recovery of the $SO_3$ gas, and potassium sulfate. To effect this operation, the temperature of the calcination should be kept well below 1072° C. Below this temperature the sulfate of aluminum will decompose, while the potassium sulfate will not be affected. After such calcination, the alumina and potassium sulfate can readily be separated by dissolving the potassium sulfate in water, the alumina being insoluble in water. If thoroughly washed, the alumina will be of high grade and practically iron free.

If the percentages of alumina and potash in the mineral are such, in practicing the process as above described, that the potassium sulfate does not balance with the aluminum sulfate to form the alum, then from time to time such balance can be restored by adding either potash or alumina as may be deficit either during the leach or the rest of the process. The alumina can be added either pure or in the form of bauxite, prior to the potash-alum crystallization, thus increasing the amount of crystals obtained.

Having thus described my invention, what I claim, and desire to secure by Letters Patent, is:

1. The method of treating siliceous minerals containing potassium, aluminum and ferric iron in combined form which consists in treating the mineral with sulfuric acid, converting said ingredients into sulfates in solution, separating the solution from the residue, crystallizing out a part of the potassium and aluminum sulfates as potash-alum, separating the crystals from the mother liquor, and precipitating the ferric sulfate and the remainder of the potassium and aluminum sulfates in strong sulfuric acid.

2. The method of treating siliceous minerals containing potassium, aluminum and ferric iron in combined form which consists in treating the mineral with sulfuric acid, converting said ingredients into sulfates in an acid solution, separating the solution from the residue, crystallizing out while still strongly acid a part of the potassium and aluminum sulfates as potash-alum, separating the crystals from the mother liquor, and precipitating the ferric sulfate and the remainder of the potassium and aluminum sulfates in strong sulfuric acid.

3. The method of treating siliceous minerals containing potassium, aluminum and ferric iron in combined form which consists in treating the mineral with sulfuric acid, converting said ingredients into sulfates in solution, separating the solution from the residue, crystallizing out a part of the potassium and aluminum sulfates as potash-alum, separating the crystals from the mother liquor, precipitating the ferric sulfate and the remainder of the other sulfates in strong sulfuric acid, separating the precipitate and adding the strong acid to the leaching tank for treating a succeeding batch of mineral.

4. A process of producing ferric oxide admixed with relatively small amounts of other metallic compounds which consists in treating a siliceous mineral containing ferric iron, potassium and aluminum in combined form to obtain a solution of the sulfates of the metals, crystallizing potash alum from the solution, and precipitating the remaining sulfates in strong sulfuric acid.

In testimony whereof, I have signed my name to this specification.

ARTHUR J. MOXHAM.